(12) United States Patent
Löhrke (10) Patent No.: US 8,528,576 B2
(45) Date of Patent: Sep. 10, 2013

(54) CLEANING SYSTEM AND CLEANING PROCESS

(75) Inventor: Martin Löhrke, Lübeck (DE)

(73) Assignee: Jürgen Löhrke GmbH, Lübeck (DE)

( * ) Notice: Subject to any disclaimer, the term of this patent is extended or adjusted under 35 U.S.C. 154(b) by 92 days.

(21) Appl. No.: 12/706,854

(22) Filed: Feb. 17, 2010

(65) Prior Publication Data
US 2010/0269864 A1 Oct. 28, 2010

(30) Foreign Application Priority Data
Feb. 17, 2009 (DE) .................. 10 2009 009 244

(51) Int. Cl.
*B08B 3/00* (2006.01)

(52) U.S. Cl.
USPC .......................... 134/180; 134/56 R (58) Field of Classification Search
USPC ........................................ 134/56 R
See application file for complete search history.

(56) References Cited

U.S. PATENT DOCUMENTS

| | | | |
|---|---|---|---|
| 4,696,612 A * | 9/1987 | Germond et al. ........... | 414/8 |
| 5,941,290 A | 8/1999 | Vaughn, Jr. | |
| 6,374,748 B1 * | 4/2002 | Shiwaku et al. ........... | 104/243 |
| 6,698,575 B2 * | 3/2004 | Gartner ...................... | 198/465.4 |
| 2005/0092354 A1 | 5/2005 | Jeong et al. | |

FOREIGN PATENT DOCUMENTS

| | | |
|---|---|---|
| DE | 3141516 A1 | 5/1983 |
| DE | 36 23 350 A1 | 4/1988 |
| DE | 690 12 532 T2 | 5/1995 |
| DE | 200 19 305 U1 | 6/2001 |
| DE | 101 02 758 A1 | 7/2002 |
| DE | 101 10 373 C2 | 9/2002 |
| DE | 102007005029 A1 | 9/2008 |
| GB | 2446739 A | 8/2008 |
| WO | 02090007 A1 | 11/2002 |
| WO | 2008061951 A1 | 5/2008 |

OTHER PUBLICATIONS

EP Search Report issued Sep. 27, 2010 in EP Application No. 10001608.8.
Office Action issued Oct. 19, 2012 in EP Application No. 10 001 608.8.

* cited by examiner

*Primary Examiner* — Michael Kornakov
*Assistant Examiner* — Jason Ko
(74) *Attorney, Agent, or Firm* — Panitch Schwarze Belisario & Nadel LLP (57) ABSTRACT

A cleaning system for an installation processing foodstuffs, with a guide path and with a robot arm which is displaceable along the guide path and on which at least one nozzle for discharging a cleaning agent onto the installation, is attached in a manner such that the at least one nozzle may be moved in a targeted manner to individual points of the installation for its cleaning, by way of displacing and moving the robot arm.

17 Claims, 4 Drawing Sheets

CLEANING SYSTEM AND CLEANING PROCESS

BACKGROUND OF THE INVENTION

The present invention relates to a cleaning system for an installation processing foodstuffs, for example for a filling installation or packaging installation for foodstuffs, as well as to an associated cleaning method.

Installations in the foodstuffs industry, be they for processing foodstuffs, for filling and packaging foodstuffs, need to be regularly cleaned or disinfected. Nowadays, it is usual to install cleaning-in-place systems for this, for example in drinks bottling installations, which may automatically clean the installations. For this, it is necessary to attach spray nozzles on all installation parts to be cleaned, the nozzles being capable of spraying cleaning agents or disinfectants, be they in liquid form or as a foam or gel, onto the installation parts to be cleaned. These nozzles distributed over the complete installation, require an extensive pipework system. For reasons of hygiene, when designing the installations, one seeks to design these from the very start in a manner such that there are as few as possible locations, at which contamination may accumulate. Contrary to this is the extensive pipework, which is required for the cleaning system itself.

With regard to the above set of problems, it is the object of the present invention to provide an improved cleaning system or a cleaning method for installations processing foodstuffs, which may be integrated into the installation in a simpler manner and with a reduced compromising of the hygienic machine design.

BRIEF SUMMARY OF THE INVENTION

The above object is achieved by a cleaning system with the features specified in the claims, as well as by a cleaning method with the features specified in the claims. Preferred embodiments are to be deduced from the associated dependent claims, the subsequent description and the attached figures.

The essential idea of the present invention is not to envisage the cleaning of the installation with a multitude of fixedly installed nozzles at all locations to be cleaned, but rather to apply a reduced number of moving nozzles, which may be displaced in a targeted manner to the locations of the installation, which are to be cleaned. For this, one envisages arranging a guide path, on which a robot arm is mounted in a displaceable manner. The guide path thus forms a rail, along which the robot arm may be moved. The robot arm itself, at its freely movable end, carries at least one nozzle for discharging a cleaning agent. This may be a cleaning agent or a disinfectant, be it in liquid form or as a foam, gel, water or steam, or another medium required for cleaning the installation. The robot arm itself permits a movability of the nozzle relative to the articulation point on the guide path, so that the robot gives the movement of the nozzle yet further degrees of freedom beyond the movability along the guide path. The number of degrees of freedom of the robot arm and its exact geometric design, as well as the exact arrangement of the guide path are selected such that the at least one nozzle may be moved to all locations of the installation which are to be cleaned, by way of displacing and moving the robot arm, in order there to then discharge the cleaning agent in a precise manner.

The complete fixed pipework for a cleaning system or disinfection system on the installation becomes superfluous on account of this design according to the present invention. This significantly simplifies the construction of the installation and improves the hygienic design of the installation, since no additional locations at which contamination may accumulate, are created by way of the cleaning system. Moreover, the system according to the present invention permits a very flexible cleaning of the installation, since the cleaning process may be changed and adapted to differing demands by way of a simple change of the control of the displacement and movement system of the robot. Thus, spray angles of the nozzle and likewise, may be easily changed, in order to be able to optimally adapt cleaning functions, without having to carry out conversion measures on the installation.

The robot arm preferably comprises at least two and further preferably six degrees of freedom for the movement of the nozzle. Thereby, it is the case of degrees of freedom with respect to the articulation point on the guide path. The movability along the guide path then forms an additional degree of freedom. The robot arm may be designed as an articulated arm robot similarly to a common industrial robot. However, one may also apply other robot arms. For example, it may also be the case of a pendulum arm robot or a cylindrical coordinate robot. A portal system would also be conceivable. The number of required degrees of freedom and the exact design principle depends significantly on the construction of the installation to be cleaned. The robot arm and the guide path need to be arranged such that all points to be cleaned may be moved to. The nozzle is preferably arranged at the free outer end of the robot, so that it has an as large as possible movement ability.

Usefully, the guide path is attached above the installation to be cleaned and the robot is guided in a suspended manner on the guide path. This construction hardly compromises the installation to be cleaned. Moreover, the accessibility of the installation from all sides is not restricted by the cleaning system. The guide path itself and the robot arm are less easily contaminated. However, it would also be basically possible to arrange the guide path laterally of, or below the installation to be cleaned, and to guide the robot on the guide path, as the case may be, accordingly in a standing or laterally suspended manner. It is also conceivable for the guide path to change its vertical position relative to the installation during its course, i.e. to be guided laterally or below the installation in some regions of the installation, and above the installation in other installation regions.

The guide path preferably runs at least along the outer contour of the installation, in particular along the complete outer contour, so that the robot arm and the nozzle may be moved up to the installation from all sides.

The system according to the present invention is not limited to the cleaning of an individual installation, but rather it is also possible to arrange the guide path along several installations to be cleaned. These may be installations which have an interrelationship with one another, or however installations which are independent of one another, but which are cleaned by one and the same cleaning robot. Thus, for example, it is possible in a filling operation with several filling lanes, to provide a single cleaning robot, which cleans the lanes in an alternating manner, whilst the other filling installations are in normal operation. For this, the robot arm is merely displaced along the guide path to the installation which is to be cleaned at that time. The cleaning system according to the present invention is thereby not limited to the cleaning of installations, but also further objects or the room in which the cleaning system is located, may be cleaned. The guide path needs only to be arranged in a suitable manner, such that the robot arm may reach all regions to be cleaned. This way the investment costs may be reduced, since the number of required robot arms is reduced. Thereby, one should understand that the system according to the present invention is not limited to the arrangement of a robot arm, but it is also conceivable to provide several robot arms on the system, in order to be able to carry out the cleaning more rapidly.

It is necessary to provide the guide path with branches in more complex systems. Thus, at least one branch may be present in the guide path, wherein a diverter or rotary plate for direction change is arranged at the branch point. The robot arm may be rotated on the spot with the rotary plate. One may thus achieve very small bending radii. A portion of the guide path with the robot arm positioned at this location is rotated on the spot, on the rotary plate. As a whole, the guide path may be constructed in a modular manner. This means that standard sections with straight lines or radii may be provided, which may be suitably combined with one another depending on the place of application, in order to form a guide path which is suited to the respective installation. Alternatively, individual part portions with special shapes or radii of curvature may also be manufactured. The modular construction however has the advantage that the number of individual parts which are to be manufactured for the guide path may be reduced to a few standard parts.

According to a further preferred embodiment of the present invention, a cleaning station is provided in the system, to which the guide path leads and at which cleaning nozzles are arranged for the outer cleaning of the robot arm. This permits the robot arm to be displaced along the guide path into the cleaning station and to be cleaned there from the outside with the cleaning nozzles installed in a fixed manner, with suitable cleaning media and disinfecting media. The robot arm itself is preferably provided with a protective casing or protective jacket, for example of a sealed plastic film, so that on the one hand a contamination of the mechanical parts of the robot arm is prevented, and on the other hand one prevents contamination getting into the installation from the robot arm. Such a protective jacket may be easily cleaned by way of spraying.

The guide path is preferably formed of at least one round profile, further preferably of two round profiles running parallel to one another. Such round profiles, for example of stainless steel, are available as standard parts such as tubes or solid material. Moreover, they may be easily bent into the desired radii and have a smooth, easily cleaned surface, on which it is difficult for contamination to accumulate. Preferably, the rail or the guide path is formed of two round profiles or tubes, which are arranged parallel to one another. Such an arrangement permits an improved guiding of the robot arm, since a swinging or a rotation about the longitudinal axis of the guide path may be prevented. The two round profiles are preferably firmly connected to one another via transverse webs. The transverse webs are further preferably arranged at regular distances to one another, so that they may simultaneously serve for path detection or position detection on displacing the robot along the guide path, since the number of passed webs may be simply counted by way of a suitable detection system, in order thus to determine the covered path distance and thus the position of the robot arm. Additionally or alternatively, the position detection may also be effected via other path measurement systems or recording systems, for example the revolutions of a drive wheel or guide wheel rolling on the guide path may also be counted.

Further preferably, a fluid conduit for the supply of the cleaning agent may be formed in the inside of the guide path. This is possible in a particularly favorable manner if the guide path comprises at least one tubular profile, since this tube may then simultaneously lead the cleaning medium in its inside. The number of individual parts and the material expense may be reduced in this manner.

In a further preferred embodiment of the present invention, the cleaning agent supply to the robot arm is effected via a flexible tubing conduit, which connects the robot arm to a central connection for the supply of the cleaning agent. Thus, for example, with a tubular contour of the guide path, the central connection may be arranged essentially in the middle of the path, and the flexible tubing extends from there roughly radially to the robot arm on the guide path. With a movement of the robot arm, the flexible tubing then revolves around the central connection. A rotating connection or rotation coupling is preferably provided in this, so that the movement of the robot arm along the guide path is not limited by this flexible tubing feed. The electrical energy supply of a drive on the robot arm may also be effected via a suitable cable, which extends similarly to the flexible tubing conduit. Data or control leads may thus be laid. Data signals or control signals could however also be effected in a wireless manner via radio. The electrical energy supply may moreover also be realized via electrical rails along the guide path.

According to a further preferred embodiment of the present invention, a docking station is arranged on the guide path, said docking station comprising connection couplings for at least one fluid conduit and preferably at least one electrical connection, wherein the robot arm comprises corresponding connection couplings, which on reaching the docking station may come into engagement with the connection couplings of the docking station. The corresponding connection couplings of the robot arm are preferably arranged on or in the base of the robot arm, which is guided in a displaceable manner on the guide path. The docking station and the corresponding connection couplings permit the robot arm with its connection couplings to be able dock onto the connection couplings of the docking station when the robot arm has reached the docking station on the guide path, so that there, a connection of the fluid conduit between the docking station and the robot arm, and, as the case may be, also electrical connections may be created. In this manner, the supply of the cleaning agents may be effected by the fluid conduit from the docking station into the robot arm. Thus, one may make do without the supply by way of a flexible tubing conduit to a central point. Instead, suitable docking stations are then arranged preferably at all points of the guide path, at which cleaning tasks are to be carried out by the robot arm, in order to be able to ensure the supply of a cleaning agent to the robot arm at these locations. The robot arm then leads from docking station to docking station, in order there in each case to dock on and carry out a cleaning procedure at a special point or region of the installation. The electricity supply of the robot arm may likewise be effected via the docking station or as described above, for example via electric rails along the guide path. If the electricity supply is effected via the docking station, it may be useful to provide the robot arm with an energy storage device, for example a battery, which permits the robot arm to be able to move from one docking station to the next with its own propulsion. The signal transmission for sensor signals or control signals is effected in this case preferably via radio, but could however also be realized via electrical contacts on the docking station.

It is also possible to reduce the cleaning agent supply and the electrical connections of the robot arm in a combination of a central supply and a type of docking station. If the guide path is designed such that several installations for example in a large hall may be cleaned with one robot arm, then it is conceivable for a docking station to be provided in the region of each installation, to which docking station the robot then couples, wherein this docking station together with the robot may be moved over a certain region of the guide path, in which then the cleaning agent supply and, as the case may be, the electric energy supply are effected via flexible tubing conduits or cables from a central point. If the robot then moves further to the next installation, it decouples from the docking station, moves to the next installation and then couples again to a respective docking station. In this manner, one may clean very large installations without any problem by way of one or a few robot arms with the previously described design. The individual installations or installation parts need to only be connected to one another via suitable guide paths, so that the robot arm may move between the individual installations.

Preferably, the robot arm comprises a displacement unit, which is guided on the guide path and has a drive for displacing the robot arm along the guide path. The displacement unit forms the base of the robot arm, which holds the robot arm on the guide path. The displacement unit preferably comprises several guide rollers or drive rollers, wherein it is sufficient to drive one roller. Preferably, the drive roller rolls on the guide path with a friction fit. However, it is also conceivable to provide a toothing, via which a drive pinion engages with the guide path with a positive fit. Preferably, an electrical drive motor is arranged in the displacement unit, which drives one or more drive rollers.

The robot arm itself is preferably formed of two limbs, wherein a first limb extends proceeding from the guide path, and the second limb is preferably pivotably articulated on the end of the first limb, which is distant to the guide path. In the case of a guide path arranged at the top, the first limb extends preferably perpendicularly downwards from the guide path, and the second limb extends transversely to this direction, wherein it is preferably pivotable by 180° relative to the longitudinal axis of the first limb. This means that the limb may fold perpendicularly to the top and may be pivoted beyond an alignment of 90° to the first limb up to a position, in which it points essentially downwards. However, one does not need to provide a pivot range of precisely 180°, but a smaller pivot range is also conceivable, wherein the pivot movement is preferably effected in a plane, which extends parallel to the longitudinal axis of the first limb.

The first limb which extends preferably in the vertical direction, is preferably designed in a telescopic manner, so that the vertical distance of the nozzle to the guide path may be changed by way of retracting and extending the perpendicular limb. The second limb may also be designed in a telescopic manner.

Further preferably, at least one of the limbs is rotatable about its axis. Particularly preferably, both limbs are rotatable about their axis.

The second limb at its free end which is distant to the first limb preferably carries a nozzle holder with the nozzle. Thereby, the nozzle holder is preferably arranged in a rotatable manner. Particularly preferably, the nozzle holder extends at the end of the second limb perpendicular to this and is rotatable about its longitudinal axis. The actual nozzle thereby is preferably directed in a direction parallel to the second limb, so that the jet direction of the nozzle may be rotated by 360° by way of rotating the nozzle holder.

The cleaning agent supply in the robot arm is effected either by way of a flexible tubing conduit laid on the outside of the robot, wherein this is then preferably arranged within a protective jacket of the robot inasmuch as this is provided. Alternatively, it is also possible to let the cleaning agent supply run through the inside of the robot arm. Combinations of both systems are also possible. Thus, it is particularly preferable for the cleaning agent supply along the first telescopic limb to be effected through a spiral flexible tubing, wherein this spiral flexible tubing then runs out into the second limb. This run-out is preferably arranged in a section of the second limb, which is proximal to the first limb. The further cleaning agent supply to the nozzle is then effected through the inside of the second limb, so that this as a whole may be designed relatively thin and slim, so that it may also penetrate into restricted free spaces in the installation for its cleaning.

Particularly preferably, the cleaning agent supply in the second limb is effected through a tube situated in the inside of the second limb. This tube may then simultaneously serve for transmitting a rotational movement onto the nozzle holder. Thus, as a whole, a very slim design of the second limb may be achieved by two tubes arranged concentrically in one another. Thereby, the outer tube may preferably rotate about its longitudinal axis, so that the nozzle or the nozzle holder may be rotated about the longitudinal axis of the second limb. Moreover, in the case that the nozzle holder extends normally to this longitudinal axis, a rotation of the nozzle holder about its longitudinal axis extending transversely to the longitudinal axis of the second limb is possible by way of a rotation of the inner tube via a bevel gearing.

With a further preferred embodiment of the present invention, the robot arm comprises a tool receiver, which preferably is arranged at the free end of the robot arm, and into which a nozzle holder with the nozzle is received in an exchangeable manner. This permits a simple nozzle change, since the nozzle may be removed from the tool receiver and be replaced by a different nozzle. Such an exchange of the nozzle holder may preferably be effected in an automatic manner. For this, an exchange system may be provided in the cleaning system, on which the various nozzle holders may be kept ready and to which the robot arm may be moved for nozzle change, wherein the robot arm then lays down a nozzle holder and picks up a different nozzle holder. The tool receiver then is preferably provided with a coupling device which is actuated in an automatic or remote-controlled manner, for gripping and releasing the nozzle holders.

Further preferably, the robot arm comprises a tool receiver, which is designed for receiving processing tools and/or handling tools and/or sensors. Preferably, this is the same tool receiver which also serves for receiving different nozzle holders. This permits the robot arm to also be able to carry out different processing tasks or handling tasks, so that a universal application of the robot arm in the installation is possible. Thus, the robot arm, in a packaging installation, may for example serve for inserting the products into a packaging when for example they are not participating in the cleaning procedures. Idle times of the robot arm, in which this is not used, are avoided in this manner. However, it is to be understood that corresponding handling devices or processing devices may also be arranged in a fixed manner on the robot arm simultaneously to a nozzle holder, so that an exchange of the individual tools or nozzle holders is not necessary, but these are constantly carried along with the robot arm.

As described, the robot may be applied for handling purposes or processing purposes during the times in which it is not used for cleaning tasks.

Moreover, the application of bio-monitoring is also possible. For this, the robot arm then carries at least one sensor which is suitable for preferably optically reading off certain control points on the installation. This sensor may be attached on the robot arm in a fixed manner or for example may also be designed as an exchangeable tool, which is only received by the robot arm, when the robot arm is applied for the bio-monitoring.

The present invention further relates to a cleaning method for cleaning an installation processing foodstuffs. With regard to the cleaning method, preferably a cleaning system according to the preceding description is applied. For this reason, it is to be understood that features which have been described above with regard to the cleaning system, may likewise be used with the subsequently described cleaning method.

With regard to the cleaning method according to the present invention, a nozzle for discharging a cleaning agent is moved by way of a robot arm displaceable on a guide path, to the points of the installation which are to be cleaned. There, the cleaning agent is then discharged out of the nozzle onto the installation. This permits the precise cleaning of installation parts by way of displacing and suitably placing the nozzle. This means that the installation no longer needs to be sprayed with a cleaning agent in a large-surfaced manner, but one may clean the regions which are prone to contamination in a targeted manner. Also, individual regions may be cleaned in a differently intense manner and also at different time intervals. Here, the method according to the present invention permits a very flexible design of the cleaning procedure. Thus, the quantity of the required cleaning agent may be reduced. Moreover, a complicated installation of a cleaning system within the installation is no longer required.

Moreover, one preferably envisages the robot arm being displaced along the guide path into a cleaning station, in which one cleans from the outside by way of stationary cleaning nozzles. This is effected preferably after the cleaning tasks carried out by the robot arm, so that subsequently the robot itself is cleaned and then is ready in a cleaned manner for the next application. However, it is also conceivable to clean the robot arm directly before a cleaning procedure, in order to prevent the installation being contaminated by the robot itself on cleaning the installation.

It is particularly preferable for the robot arm to be applied for handling tasks, processing tasks or monitoring tasks or other tasks in the installation, during the times in which it carries out no cleaning tasks. Thus, a universal use of the robot arm is achieved, which avoids standstill periods. For example, the robot arm may be applied in order to insert goods or products into packages in a packaging installation. Moreover, filled receptacles may be taken from a conveyor belt and deposited onto pallets and likewise. Moreover, the robot arm may also assume monitoring and control tasks, for example may carry out a bio-monitoring within the installation via suitable sensors attached on the robot arm, by way of moving to individual points during operation and scanning or reading out bio-indicators which are attached there, by way of a sensor attached on the robot arm, for example a camera.

The cleaning system according to the preceding description preferably comprises a control device which controls the complete cleaning procedure. This control device may be linked to the usual installation control or machine control of the installations to be cleaned, so that the cleaning procedures may be carried out automatically at certain points in time. Moreover, the machine control may then also activate the robot arm at times in which the robot arm is not applied for cleaning, in order to carry out the mentioned other tasks.

Particularly preferably, the cleaning system according to the present invention and the cleaning method are applied in an installation for processing foodstuffs or in an installation for packaging or filling foodstuffs, for example in a bottle filling installation. Installations with such a cleaning system are likewise the subject matter of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is described hereinafter by way of example and by way of the attached figures. There are shown in the drawings.

DETAILED DESCRIPTION OF THE INVENTION

Certain terminology is used in the following description for convenience only and is not limiting. The words "lower," "upper," "top," "front" and "rear" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Figure 1:
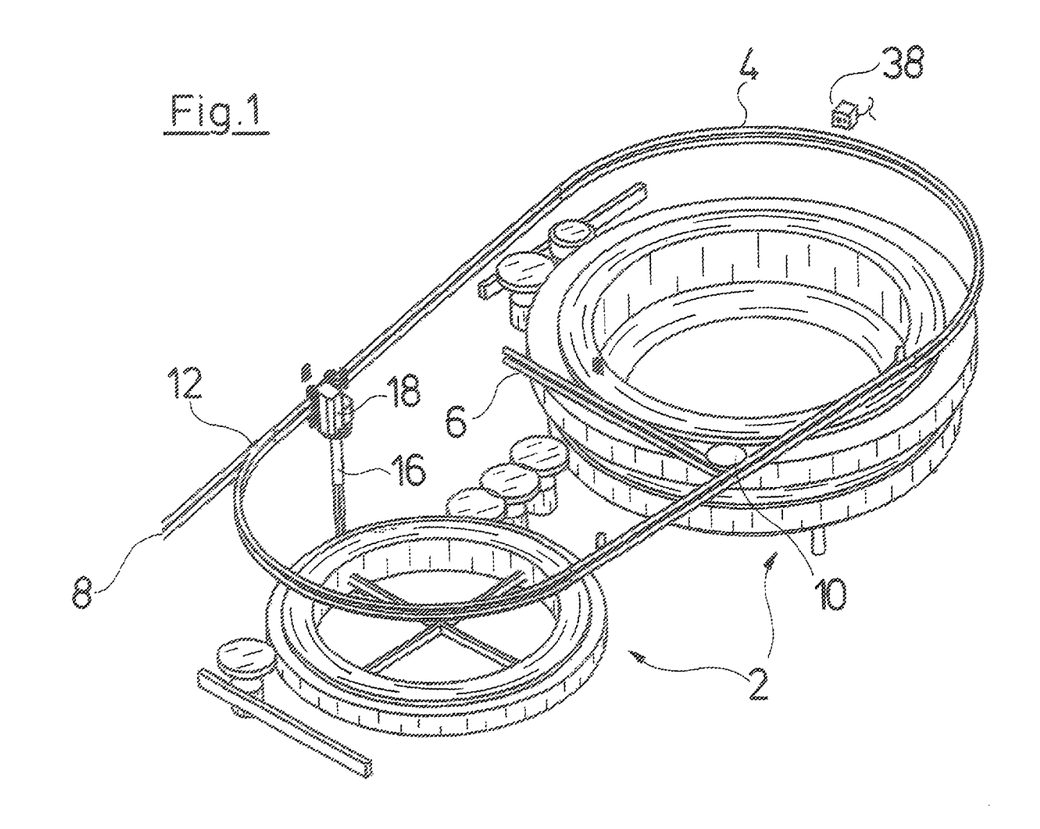
FIG. 1 is a schematic perspective view of a filling installation with a cleaning system according to a preferred embodiment of the present invention.

Referring to the drawings in detail, wherein like numerals indicate like elements throughout the several views, FIG. 1 schematically shows the entire view of an installation processing foodstuffs, in the form of a bottler 2, on which the cleaning system according to the present invention is attached. The cleaning system according to the present invention preferably comprises a guide path 4, which is arranged above the bottler 2 and travels around this on its outer contour. Thus, the guide path 4 roughly forms an oval, wherein additionally a middle web 6 is provided in the middle and a tangential branch 8 at one side. The middle web 6 is connected via a rotary plate 10 to the surrounding oval. The tangential branch 8 is connected to the oval via a diverter 12. The guide path 4 itself is formed from two tubes 14 which are arranged above one another and extend parallel to one another. A robot arm 16 is displaceable on this guide path 4. For this, the robot arm 16 with its base 18 which forms a displacement unit, is mounted on the guide path 4.

Figure 3:
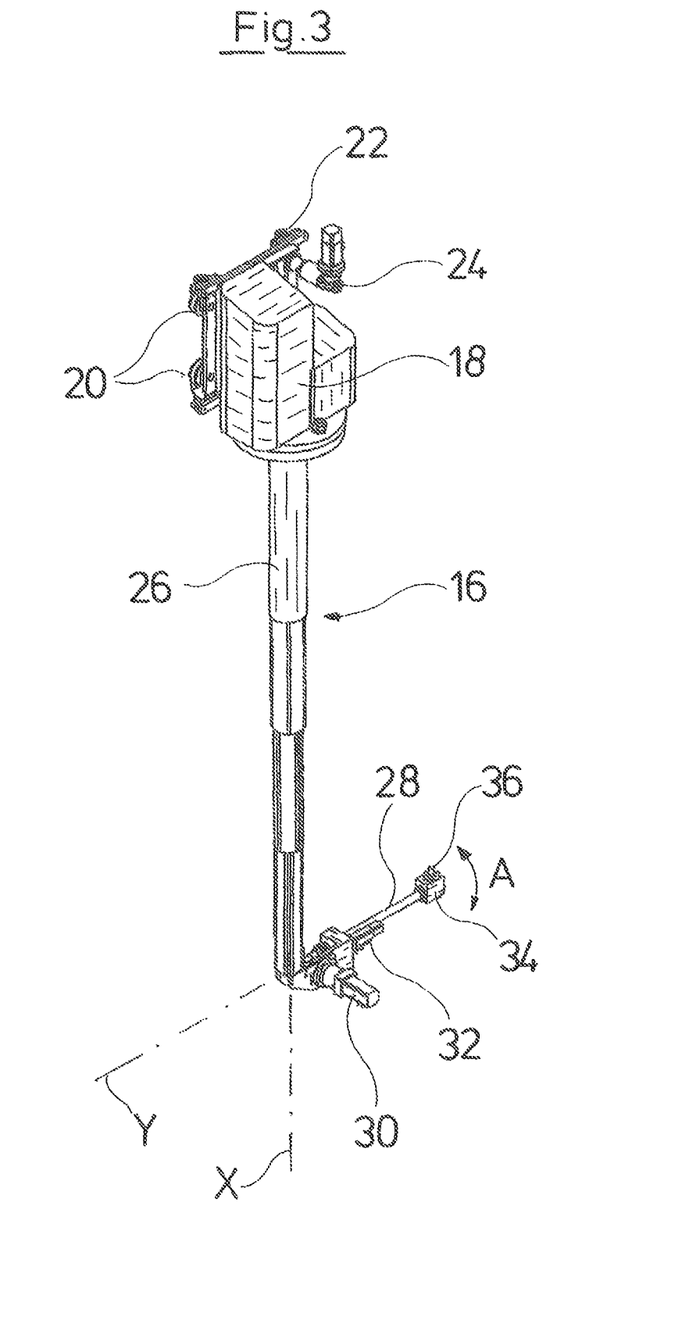
FIG. 3 is a magnified perspective view of a robot arm according to FIGS. 1 and 2.

Guide rollers 20 as well as a drive roller 22 are preferably arranged on the base of the robot arm 16. The driver roller 22 is driven via an electric motor 24. The rollers 20 and 22 are exposed on one side of the base 18, and engage around the upper side and the lower side of the pair of guide rollers 14 of the guide path 4. The laterally open arrangement has the advantage that the rollers 20, 22 are easy to clean.

Proceeding from the base 18, a first limb 26 of the robot arm extends perpendicularly downwardly. The first limb 26 in the example shown here is designed in a triple telescopic manner. The extension of the telescope is effected by its intrinsic weight. The retraction is effected by way of a pull cable which is arranged in the inside of the limb 26 and which may be rolled up in the base 18 by way of an electric motor.

A second limb 28 is attached on the first limb 26 at the longitudinal end of the first limb 26, which is distant to the base 18. The second limb 28 is pivotable via a pivot drive 30 in the direction of the arrow A, i.e. it pivots about a pivot axis, which extends normally to the longitudinal axis X of the first limb 28, wherein the longitudinal axis X as well as the longitudinal axis Y of the second limb 28 run in a plane. Moreover, a rotation drive 32 is provided in the vicinity of the pivot drive 30, via which rotation drive 32 the second limb 28 is rotatable about its longitudinal axis Y. The limb 26 is also rotatably pivotable about its longitudinal axis X, via a rotation drive arranged in the base 18.

Figure 4:
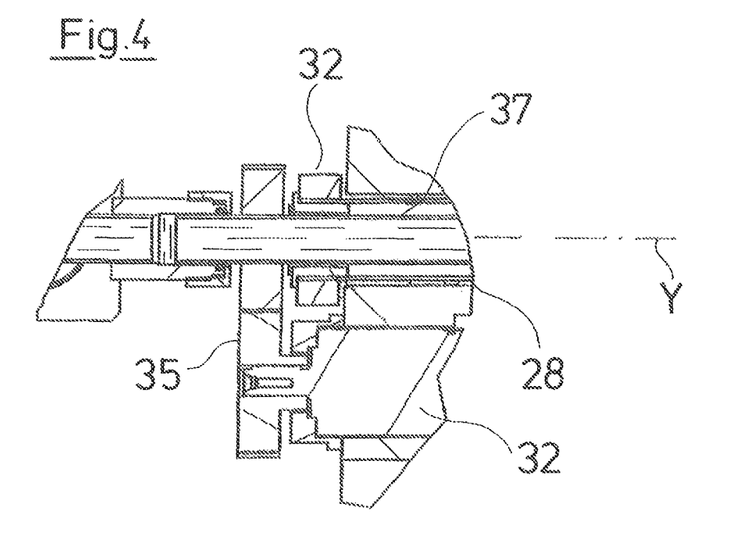
FIG. 4 is a cross-sectioned view of a rear end of a second limb of the robot arm, the end being proximal to a first limb.
Figure 5:
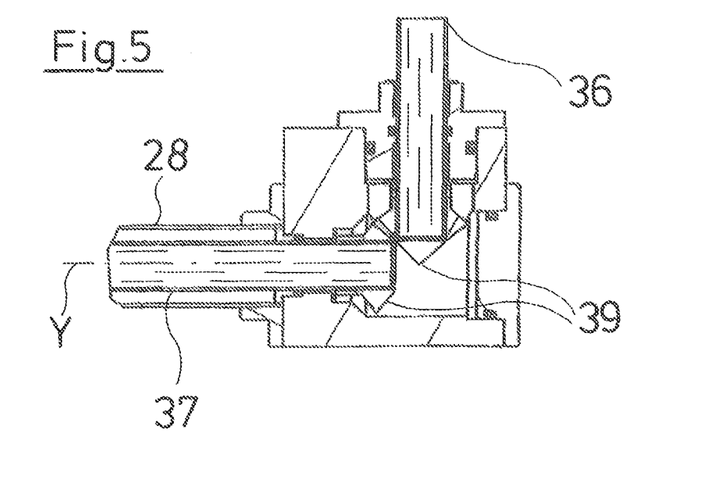
FIG. 5 is a cross-sectioned view of a front free end of the second limb.

The second limb 28 at its free end carries a tool receiver 34, in which a nozzle holder 36 is accommodated. Thereby, the nozzle holder 36 extends in a direction at right angles to the longitudinal axis Y of the second limb 28. The nozzle holder 36 is rotatable about its own axis via a further rotation drive 32. For this, a rotatable tube 37 is arranged in the inside of the second limb 28 and at its front end rotatably drives the nozzle holder 36 via a bevel gear 39. The rotation drive 32 for the inner tube 37 is arranged at its rear end which is proximal to the first limb 26, in the vicinity of the pivot drive 30, and rotatingly drives the tube 37 via a gearwheel pair 35. This inner tube 37 simultaneously serves for the supply of the cleaning agent to the nozzle in the nozzle holder 36. For this, the cleaning agent is fed into the second limb 28 or the inner tube 37, at the rear end, i.e. the end which is proximal to the first limb 26. The cleaning agent feed is effected along the first limb 26 via a spiral flexible tubing which is not shown here. Alternatively, it would also be conceivable to apply the cleaning agent into the inside of the first limb 26.

The complete robot arm 16 is encased by a protective jacket, which however is not shown here. This protective jacket of plastic film or tissue protects the robot arm from contamination and ensures that the robot arm 16 may be held in a hygienically immaculate condition.

Figure 2:
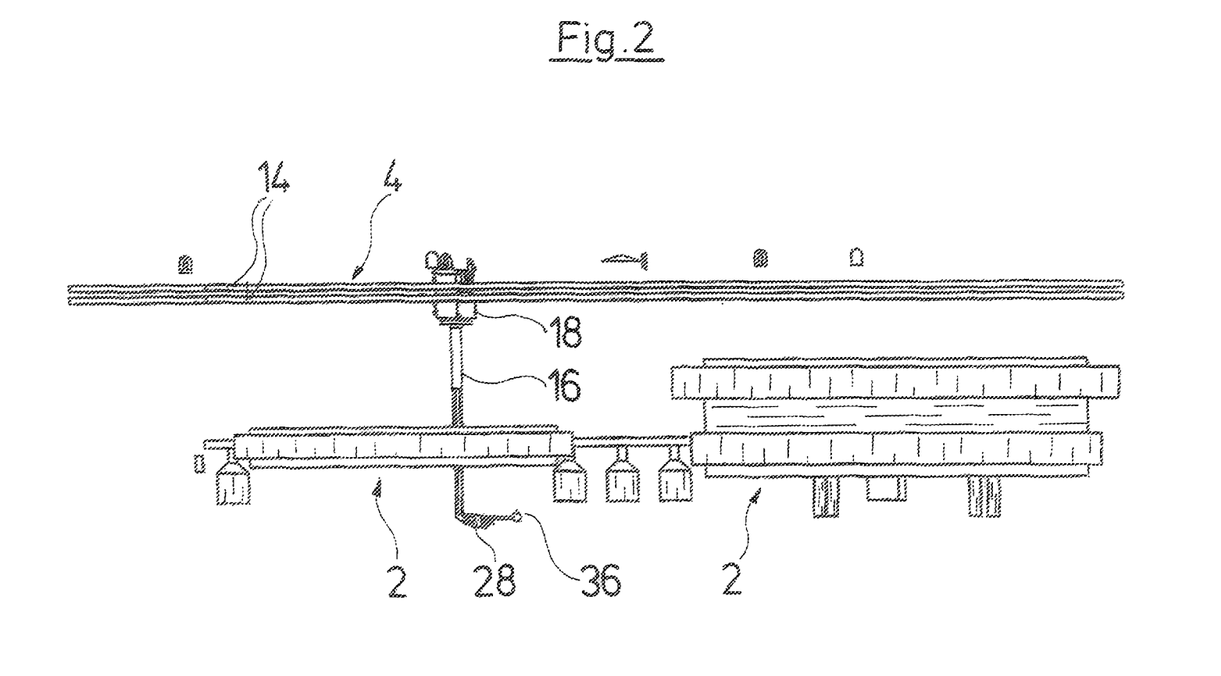
FIG. 2 is a side elevation view of the installation according to FIG. 1.

For cleaning the installation 2, the robot arm 16 is displaced along the guide path 4 such that by way of extending the telescope of the first limb 26 and moving the second limb 28 about the different axes, it may bring the nozzle of the nozzle holder 36 into those positions relative to the bottling installation 2, in which the required regions or locations of the installation 2 which require cleaning, may be cleaned in a targeted manner, by way of them being sprayed with cleaning agent or disinfectant. Thus, the robot arm 16 may travel successively to the locations of the installation 2 which are to be cleaned, along the guide path 4. The supply of energy and cleaning agent to the robot arm 16 is thereby effected via cables or conduits from a central point in the inside of the oval spanned by the guide path 4. These conduits are not shown in the figures. A data communication to the robot arm 16 may be effected via suitable leads, but may also be effected in a wireless manner.

The robot arm 16 is displaced onto the rotary plate 10, in order to be able to travel the middle web. This plate is then rotated by 90°, wherein a part of the guide path 4, on which the robot arm 16 is located at this moment, is likewise rotated by 90°, so that it extends in the direction of the middle web and the robot arm may then move onto this.

The branch 8 leads to a maintenance and cleaning station for the robot arm 16, which is not shown here. The robot arm 16 may be moved to here, in order to clean it. Cleaning nozzles which are installed in a fixed manner, may be arranged on the cleaning station, and these may spray or rinse the robot arm 16. Moreover, e.g. one may also provide a tool exchange station there, at which the robot arm 16 may automatically exchange the nozzle holder 36 for another nozzle holder 36, handling tools or processing tools or sensors, with which further processing tasks may be carried out.

Instead of accomplishing the cleaning agent supply to the robot arm 16 via a central flexible tubing conduit, one may also arrange several docking stations 38 along the guide path, of which only one is shown in the figure. These docking stations 38 comprise connection couplings for a fluid conduit, and, as the case may be, for electrical connections. The base 18 of the robot arm is then provided with suitably fitting couplings, which are not shown here and which may engage with the docking station 38 when the robot arm 16 is located along the guide path 4 at the position of a docking location 38. Then a fluid connection to the robot arm 16, by way of which the cleaning agent may be supplied, may be created at this location via the docking station 38. These docking stations 38 are arranged at all the points along the guide path 4, at which the robot arm 16 must stop in order to carry out cleaning tasks. The electrical energy supply may also be effected via the docking location 38. A battery may be provided in the base, in order to supply the electrical drive with energy during the displacement, in order to permit a displacement of the robot arm 16 from docking station 38 to docking station 38. The battery may then be charged again at the docking station.

Additionally to the nozzle holder 36, one may yet arrange sensors on the robot arm 16. Alternatively, these sensors may be provided in a manner which is exchangeable with the nozzle holder 36, so that the nozzle holder 36 may be replaced by a sensor by way of a tool change. The sensor may e.g. be used in order to travel to certain locations or points in the filling installation 2 with the help of the robot arm 16, and there, to carry out a bio-monitoring by reading or scanning of indicator elements. The robot arm in this manner may also be used even when it is not applied for cleaning purposes. One may also provide an automatic bio-monitoring without additional devices.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A foodstuff processing apparatus comprising:
    a device configured to handle or treat foodstuff; and
    a cleaning system having:
    (i) a guide path (4) being at least partially arcuate and extending around at least an outer contour of the foodstuff processing apparatus, the guide path (4) being positioned above and surrounding the device, and
    (ii) a robot arm (16) displaceable in at least a partially arcuate manner along the guide path (4), the entire robot arm (16) extending downwardly from the guide path (4), the robot arm (16) including a first limb (26) extending downwardly from the guide path (4), a second limb (28) pivotably articulated to an end of the first limb below the guide path, and at least one nozzle (36) at an end of the second limb opposite the first limb for discharging a cleaning agent onto the device,
    wherein, in addition to the robot arm (16) being displaceable along the guide path (4) in the arcuate manner around at least a portion of the foodstuff processing apparatus, the robot arm (16) has at least two degrees of freedom for movement of the nozzle (36), and wherein the nozzle (36) is attached on the robot arm such that the at least one nozzle (36) may be moved in a targeted manner to individual points of the apparatus for cleaning the device by displacing and moving the robot arm (16).

2. A foodstuff processing apparatus according to claim 1, wherein at least one branch (6, 8) is present in the guide path (4), and wherein a diverter (12) or a rotary plate (10) is arranged at a branch point for directional change.

3. A foodstuff processing apparatus according to claim 1, wherein a cleaning station is provided, to which the guide path (4) leads and at which cleaning nozzles for outer cleaning of the robot arm (16) are arranged.

4. A foodstuff processing apparatus according to claim 1, wherein the guide path (4) is formed of two round profiles (14) which run parallel to one another.

5. A foodstuff processing apparatus according to claim 1, wherein a fluid conduit for the feed of the cleaning agent is formed in the inside of the guide path (4).

6. A foodstuff processing apparatus according to claim 1, wherein the robot arm (16) is connected via a flexible tubing conduit to a central connection for supply of the cleaning agent.

7. A foodstuff processing apparatus according to claim 1, wherein at least one docking station (38) is arranged on the guide path (4), said docking station (38) comprising connection couplings for at least one fluid conduit, and at least one electrical connection, wherein the robot arm (16) comprises corresponding connection couplings, which on reaching the docking station (38) may come into engagement with the connection couplings of the docking station.

8. A foodstuff processing apparatus according to claim 1, wherein the robot arm (16) comprises a drive (22, 24) for displacing the robot arm (16) along the guide path (4).

9. A foodstuff processing apparatus according to claim 1, wherein the first limb (26) extends in the vertical direction (X) and in a telescopic manner.

10. A foodstuff processing apparatus according to claim 9, wherein at least one of the limbs (26, 28) is rotatable about its axis (X, Y).

11. A foodstuff processing apparatus according to claim 1, wherein the second limb (28) at the end of the second limb opposite the first limb carries a nozzle holder (38) with the nozzle, wherein the nozzle holder (38) is arranged in a rotatable manner.

12. A foodstuff processing apparatus according to claim 1, wherein the robot arm (16) comprises a tool holder (34), in which a nozzle holder (38) with the nozzle is received in an exchangeable manner.

13. A foodstuff processing apparatus according to claim 1, wherein the robot arm (16) comprises a tool receiver (38) for receiving processing tools or handling tools or sensors.

14. A foodstuff processing apparatus according to claim 1, wherein the robot arm (16) may carry out processing tasks or handling tasks on or in the installation (2), in the times in which it is not applied for cleaning the installation (2).

15. A foodstuff processing apparatus according to claim 1, wherein the robot arm (16) carries at least one sensor for carrying out a bio-monitoring on the installation.

16. A foodstuff processing apparatus according to claim 1, wherein the guide rail is a closed loop.

17. A foodstuff processing apparatus comprising:
a cleaning system having:
a guide path (4) being at least partially arcuate and running at least along an outer contour of the foodstuff processing apparatus;
a base (18) including guide rollers (20) that engage an exterior surface of the guide path (4); and
a robot arm (16) displaceable along the guide path (4) and including a first limb (26) extending downwardly from the guide path (4), a second limb (28) pivotably articulated to an end of the first limb below the guide path, and at least one nozzle (36) at an end of the second limb opposite the first limb for discharging a cleaning agent,
wherein the robot arm (16) has at least two degrees of freedom with respect to the base (18) for movement of the nozzle (36), and wherein the nozzle (36) is attached on the robot arm such that the at least one nozzle (36) may be moved in a targeted manner to individual points of the apparatus for cleaning thereof by displacing and moving the robot arm (16).

* * * * *